UNITED STATES PATENT OFFICE.

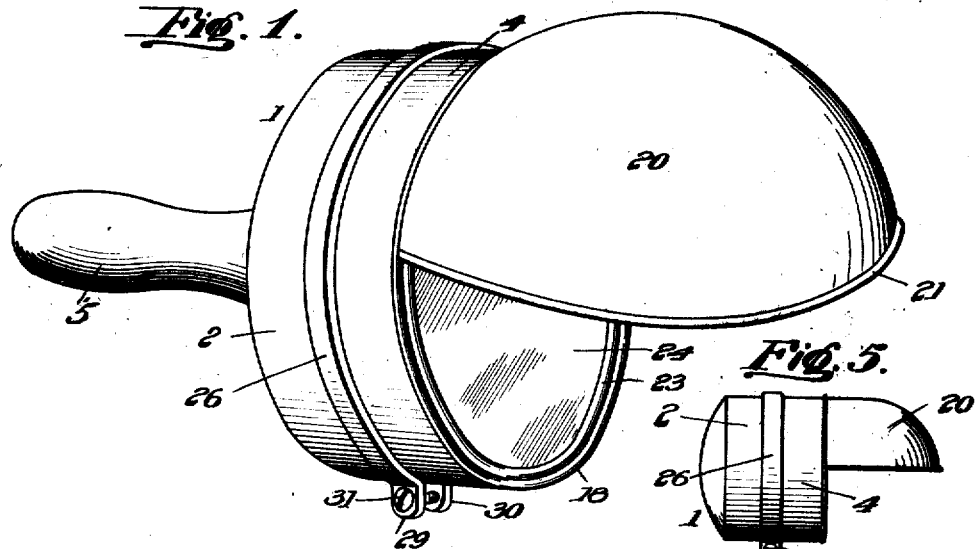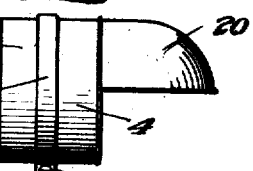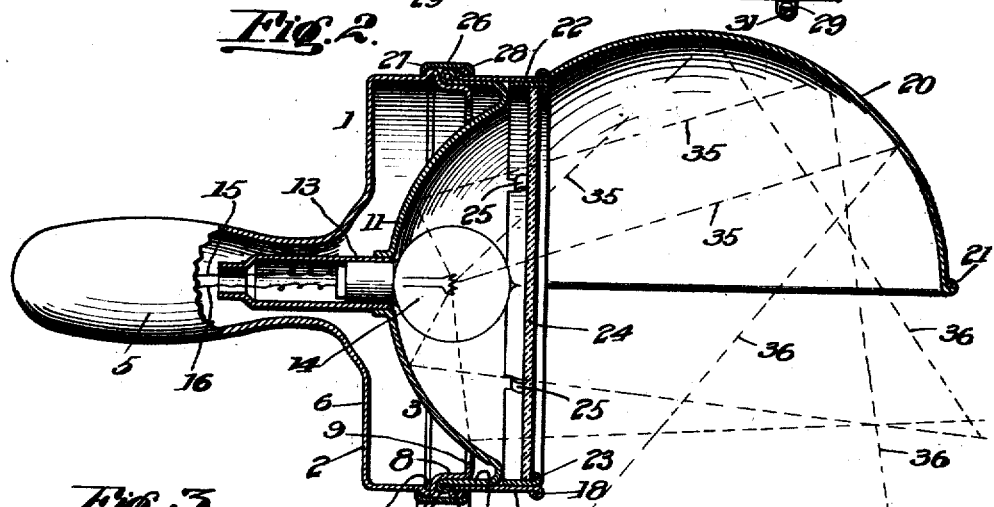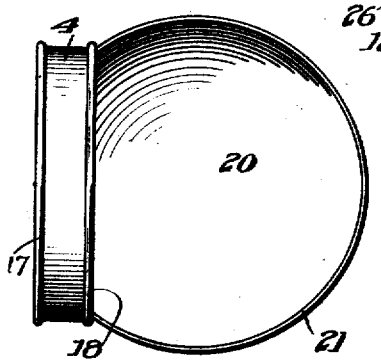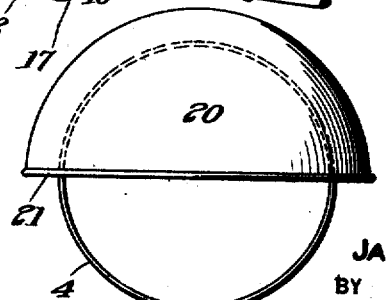

JACK CATHRILL, OF LOS ANGELES, CALIFORNIA.

LAMP.

1,403,147. Specification of Letters Patent. Patented Jan. 10, 1922.

Application filed June 17, 1920. Serial No. 389,700.

*To all whom it may concern:*

Be it known that I, JACK CATHRILL, a citizen of the United States, residing at Los Angeles, in the county of Los Angeles and State of California, have invented new and useful Improvements in a Lamp, of which the following is a specification.

My invention relates to electric lamps and my object is to provide an improved detachable shield and reflector for shielding the upper rays of the light and reflecting them downwardly in front of the lamp.

My invention is illustrated in the accompanying drawing, forming a part of this specification, in which:

Figure 1 is a perspective view of a hand lamp embodying my invention.

Figure 2 is a longitudinal section of the lamp shown in Figure 1.

Figure 3 is a bottom plan view of the shield and reflector.

Figure 4 is a front view of the shield and reflector.

Figure 5 is a side view of an automobile head light embodying my invention.

In the drawing, 1 indicates the lamp casing which is formed in three sections, a rear cup-shaped section 2, an intermediate section 3, and a forward annular section 4. A hollow handle 5 extends rearwardly from the rear wall 6 of the rear section 2. The section 2 has an external annular bead 7, an inwardly offset annulus 8 forwardly of said bead and an inwardly curved flange 9. The section 3 has an annular side wall 10 and a parabolic lamp reflector 11 joined at its outer forward edge to the forward edge of the annular side wall 10. On the rear end of the wall 10 is an annular external bead 12. The annular wall 10 telescopes over the annulus 8, the bead 12 engaging the bead 7 and limiting the rearward position of the section 3 on the section 2. The reflector 11 has a rearwardly extending lamp socket 13 which receives an electric light 14, the leads 15 and 16 of which extend through said socket and through the handle 5. On the rear edge and on the forward edge of the section 4 are annular external beads 17 and 18 respectively. From the upper half of the forward edge of the section 4 extends a curved shield and reflector 20 which is partly spherical in section. The section 4 telescopes over the annular wall 10 of the section 3, the bead 17 engaging the bead 12 and limiting the rearward position of the section 4 on the section 3. The lower edge of the shield and reflector 20 has an external bead 21. Inwardly the forward end of the section 4 is detachably fitted an annular glass frame 22 having an internal bead 23 at its forward edge against the inner edge of which rests a glass 24 inside the frame; clips 25 being struck out of the frame and bent against the inner surface of said glass to hold the glass against said bead in position in said frame.

A split ring clamp 26 having internal flanges 27 and 28 fits over the beads 7, 12 and 17, said flanges engaging the beads 7 and 17 to hold the sections 2, 3 and 4 in telescopic relation to each other. On the ends of the clamp ring are outwardly extending lugs 29 and 30. A screw 31 extends through the lug 29 and engages the lug 30 to draw the clamp tightly upon the casing 1 over the beads 7, 12 and 17, thus clamping the sections 2, 3 and 4 in proper telescopic relation to each other.

The partly spherical shield and reflector 20 extends along the upper half of the annular section 4 and projects outwardly and downwardly therefrom with its lower edge lying substantially on a plane with the horizontal diameter of the annular section 4, thus covering the upper half of the space bounded by the annular section and forming a downwardly facing spherical reflective surface on its underside which will act to cut off the upwardly projecting light rays from the reflector 11 to an observer facing the lamp and reflect these rays downwardly both to the front and to the side of the lamp when the latter is disposed horizontal. This renders the lamp particularly serviceable either as a spot light, as shown in Figure 1, and as a headlight for vehicles, as shown in Figure 5; the combined shield and reflector serving to prevent the blinding glare incident to the ordinary headlights.

I claim:

1. In an electric lamp, a casing comprising a rear section, an intermediate section, and a forward section, the intermediate section telescoping over the rear section, and the forward section telescoping over the intermediate section, a lamp reflector on the intermediate section, an electric light mounted in said reflector, a shield and reflector extending from the upper part of the forward section for shielding the upper half of the light and reflecting it downwardly in front of the lamp, and means for holding said sections in proper telescopic relation to each other.

2. In an electric lamp, a lamp casing comprising a rear section, an intermediate section, and a forward section, an annular external bead on said rear section, an annular external bead on said intermediate section, said intermediate section telescoping over the said end of said rear section, and said beads engaging each other to limit the telescopic position of said intermediate section on said rear section, an annular external bead on the rear edge of said forward section engaging the bead on said intermediate section, a ring clamp fitting over said beads, said clamp being formed with inturned flanges at its edges for engaging the beads on said rear section and said forward section respectively, a reflector on said intermediate section, an electric light mounted in said reflector, and a shield and reflector mounted on the upper part of said forward section for shielding the light of the upper portion of the lamp and reflecting said light downwardly in front of the lamp.

3. In an electric lamp, a lamp casing comprising a rear section having an external annular bead and a marginal annulus forward of the bead, an annular front section adapted to slip over the annulus having an external bead on its rear end to lie parallel with the bead on the rear section; said front section being provided at its forward end with a curved shield and reflector partly spherical in section extending outwardly over the upper half of the space bounded by the front section with its lower edge substantially on a plane with the horizontal diameter of the front section, and a split ring clamp having internal flanges adapted to set astride the beads on said front and rear sections.

JACK CATHRILL.